United States Patent
Matsen et al.

(10) Patent No.: US 9,930,729 B2
(45) Date of Patent: Mar. 27, 2018

(54) METHOD AND APPARATUS FOR FORMING A HEAT-TREATED MATERIAL

(71) Applicant: The Boeing Company, Chicago, IL (US)

(72) Inventors: Marc R. Matsen, Seattle, WA (US); Mark A. Negley, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 14/697,418

(22) Filed: Apr. 27, 2015

(65) Prior Publication Data
US 2016/0316522 A1    Oct. 27, 2016

(51) Int. Cl.
*H05B 6/10*    (2006.01)
*B22F 3/16*    (2006.01)
(Continued)

(52) U.S. Cl.
CPC .............. *H05B 6/101* (2013.01); *B21D 21/00* (2013.01); *B22F 3/03* (2013.01); *B22F 3/087* (2013.01);
(Continued)

(58) Field of Classification Search
CPC .......... B22F 2003/1053; B22F 2202/05; B22F 2202/07; B22F 2203/00; B22F 3/03;
(Continued)

(56) References Cited

U.S. PATENT DOCUMENTS 4,816,965 A * 3/1989 Drits ...................... H01F 13/00
148/108
5,591,370 A    1/1997 Matsen et al.
(Continued)

FOREIGN PATENT DOCUMENTS

| CN | 101368243 | 2/2009 |
|---|---|---|
| RU | 2383630 | 3/2010 |
| SU | 1520732 | 10/1991 |

OTHER PUBLICATIONS

Introduction to steel heat treatment, Steel heat treating fundamentals and processes. vol. 4A. ASM Handbook, ASM International. 2013. p. 3-25.*
(Continued)

*Primary Examiner* — Colleen P Dunn
*Assistant Examiner* — Nicholas A Wang
(74) *Attorney, Agent, or Firm* — Kunzler, PC

(57) ABSTRACT

Described herein is a method of forming a heat-treated material includes positioning the heat-treated material between first and second susceptors. Each of the first and second susceptors includes a tool face shaped according to a desired shape of the heat-treated material. The method also includes applying a low-strength magnetic field to the first and second susceptors to heat the first and second susceptors. Further, the method includes compressing the heat-treated material between the first and second susceptors to form the heat-treated material into the desired shape. The method additionally includes applying a high-strength magnetic field to the heat-treated material before compressing the heat-treated material between the first and second susceptors.

20 Claims, 7 Drawing Sheets

(51) Int. Cl.

| | |
|---|---|
| *B22F 3/03* | (2006.01) |
| *B22F 3/087* | (2006.01) |
| *B22F 3/105* | (2006.01) |
| *B22F 3/14* | (2006.01) |
| *H05B 6/06* | (2006.01) |
| *B21D 21/00* | (2006.01) |
| *C21D 1/18* | (2006.01) |
| *C21D 1/42* | (2006.01) |
| *C21D 6/00* | (2006.01) |
| *C21D 9/42* | (2006.01) |
| *H05B 6/08* | (2006.01) |

(52) U.S. Cl.
CPC ............... *B22F 3/105* (2013.01); *B22F 3/14* (2013.01); *B22F 3/16* (2013.01); *C21D 1/18* (2013.01); *C21D 1/42* (2013.01); *C21D 6/00* (2013.01); *C21D 9/42* (2013.01); *H05B 6/06* (2013.01); *H05B 6/08* (2013.01); *H05B 6/105* (2013.01); *B22F 2003/1053* (2013.01); *B22F 2202/05* (2013.01); *B22F 2202/07* (2013.01); *B22F 2203/00* (2013.01); *H05B 2206/023* (2013.01); *Y02P 10/253* (2015.11)

(58) Field of Classification Search
CPC .. B22F 3/087; B22F 3/105; B22F 3/14; B22F 3/16; C21D 1/18; C21D 1/42; C21D 6/00; C21D 9/42; H05B 6/06
See application file for complete search history.

(56) References Cited

U.S. PATENT DOCUMENTS

| | | | |
|---|---|---|---|
| 5,683,607 A | 11/1997 | Gillespie et al. | |
| 5,705,794 A | 1/1998 | Gillespie et al. | |
| 5,728,309 A | 3/1998 | Matsen et al. | |
| 5,914,064 A | 6/1999 | Gillespie et al. | |
| 5,935,346 A * | 8/1999 | Couderchon | C21D 1/04 |
| | | | 148/108 |
| 6,091,063 A | 7/2000 | Woods | |
| 6,528,771 B1 * | 3/2003 | Matsen | H05B 6/06 |
| | | | 219/634 |
| 6,566,635 B1 * | 5/2003 | Matsen | H05B 6/105 |
| | | | 219/633 |
| 6,576,877 B2 | 6/2003 | Dabelstein et al. | |
| 6,747,253 B1 | 6/2004 | Firth et al. | |
| 6,773,513 B2 | 8/2004 | Ludtka | |
| 7,161,124 B2 * | 1/2007 | Kisner | H05B 6/101 |
| | | | 148/567 |
| 7,534,980 B2 * | 5/2009 | Wilgen | H05B 6/101 |
| | | | 219/600 |
| 7,745,765 B2 | 6/2010 | Kisner et al. | |
| 7,897,516 B1 | 3/2011 | Kinder et al. | |
| 7,905,128 B2 | 3/2011 | Matsen et al. | |
| 8,343,402 B1 | 1/2013 | Matsen et al. | |
| 8,480,823 B1 * | 7/2013 | Matsen | B21D 37/16 |
| | | | 148/574 |
| 2004/0256383 A1 | 12/2004 | Fischer et al. | |
| 2010/0018271 A1 | 1/2010 | Matsen et al. | |
| 2010/0147834 A1 * | 6/2010 | Witte | C21D 1/10 |
| | | | 219/650 |
| 2011/0000588 A1 * | 1/2011 | Bogicevic | C21D 1/04 |
| | | | 148/559 |
| 2012/0067100 A1 * | 3/2012 | Stefansson | B21D 5/00 |
| | | | 72/342.1 |
| 2012/0080424 A1 * | 4/2012 | Wiezoreck | H05B 6/102 |
| | | | 219/652 |
| 2012/0324908 A1 * | 12/2012 | Ludtka | C21D 10/00 |
| | | | 62/3.1 |
| 2014/0219854 A1 | 8/2014 | Matsen | |
| 2014/0326717 A1 | 11/2014 | Matsen et al. | |
| 2017/0036310 A1 | 2/2017 | Matsen et al. | |

OTHER PUBLICATIONS

Imam et al., Abstract to "Fatigue and microstructural properties of quenched Ti—GAl—4V," http://link.springer.com/article/10.1007/BF02651620#page-2, accessed Jan. 14, 2016.
Office Action for Chinese Patent Application No. 201380072196.9 dated Jul. 6, 2016.
International Search Report and Written Opinion for Application No. PCT/US2013/076912 dated Apr. 16, 2014.
Ye et al., "Blended elemental powder densification of Ti—6Al—4V by hot pressing," J. Materials Research, 2011, pp. 95-969, vol. 26, Issue 8.
Ludtka, G. M., Exploring Ultrahigh Magnetic Field Processing of Materials for Developing Customized Microstructures and Enhanced Performance, Final Technical Report, Mar. 2005, pp. 1-84, Oak Ridge National Laboratory.
Notice of Allowance for U.S. Appl. No. 13/758,609 dated Jul. 29, 2016.
Office Action for Russian Patent Application No. 2016103655/02 dated Jul. 3, 2017.
AK Steel 316/616L Stainless Steel Data Sheet, 2 pages, AK Steel Corporation, 2007.

* cited by examiner

US 9,930,729 B2

METHOD AND APPARATUS FOR FORMING A HEAT-TREATED MATERIAL

CROSS-REFERENCE TO RELATED APPLICATION

This application is related to U.S. patent application Ser. No. 13/758,609, filed Feb. 4, 2013, which is incorporated herein by reference.

FIELD

This disclosure relates generally to forming materials into desired shapes, and more particularly to forming heat-treated materials into desired shapes using high-strength magnetic fields.

BACKGROUND

High-strength materials, such as hardened steel, are used in a variety of applications. In one application, high-strength steel plates are used as armor for vehicles, weapons, personnel, structures, and the like. Desirably, high-strength steel plates are thick and strong in order to withstand powerful impacts, which makes the formation of such steel plates into desired shapes difficult.

SUMMARY

The subject matter of the present application provides embodiments of methods for forming a heat-treated material, and associated apparatuses and systems for manufacturing a heat-treated material, that overcome the above-discussed shortcomings of prior art techniques. The subject matter of the present application has been developed in response to the present state of the art, and in particular, in response to shortcomings of conventional methods, apparatuses, and systems for forming heat-treated materials, such as high-strength steel plates.

According to one embodiment, a first method of forming a heat-treated material includes positioning the heat-treated material between first and second susceptors. Each of the first and second susceptors includes a tool face shaped according to a desired shape of the heat-treated material. The first method also includes applying a low-strength magnetic field to the first and second susceptors to heat the first and second susceptors. Further, the first method includes compressing the heat-treated material between the first and second susceptors to form the heat-treated material into the desired shape. The first method additionally includes applying a high-strength magnetic field to the heat-treated material before compressing the heat-treated material between the first and second susceptors.

In some implementations of the first method, the low-strength magnetic field is an oscillating magnetic field. The oscillating magnetic field can have a peak magnetic flux below 0.5 tesla.

According to certain implementations of the first method, the high-strength magnetic field is a non-oscillating magnetic field. The high-strength magnetic field can have a magnetic flux above 1 tesla. In one implementation, the magnetic flux of the high-strength magnetic field is above 5 tesla. The high-strength magnetic field can increase a ductility of the heat-treated material by at least about 50% in certain implementations.

In some implementations of the first method, the high-strength magnetic field alters deformation properties of the heat-treated material without changing a phase of the heat-treated material. The high-strength magnetic field can increase a ductility of and decrease yield stresses in the heat-treated material.

According to some implementations of the first method, the heat-treated material includes an armor plate made from a high-strength steel.

In yet some implementations of the first method, the low-strength magnetic field and the high-strength magnetic field are non-concurrently applied using the same electromagnetic coils.

According to certain implementations of the first method, applying the high-strength magnetic field to the heat-treated material includes applying a plurality of non-oscillating high-strength magnetic field pulses to the heat-treated material.

In certain implementations, the first method additionally includes heating the heat-treated material to a processing temperature away from a phase transition temperature of the heat-treated material with heat from the first and second susceptors. The processing temperature can be below about 150° C.

In one implementation, the first method further includes concurrently quenching the first susceptor, second susceptor, and the heat-treated material after compressing the heat-treated material between the first and second susceptors.

According to another embodiment, a second method of forming a material includes heat treating the material to form a heat-treated material. The second method also includes positioning the heat-treated material between first and second susceptors. Each of the first and second susceptors includes a tool face shaped according to a desired shape of the heat-treated material. Additionally, the second method includes applying a low-strength magnetic field to the first and second susceptors to heat the first and second susceptors. The second method also includes compressing the heat-treated material between the first and second susceptors to form the heat-treated material into the desired shape. Also, the second method includes applying a high-strength magnetic field to the heat-treated material before compressing the heat-treated material between the first and second susceptors. Heat treating the material may include hardening the material.

In some implementations of the second method, heat treating the material includes raising the temperature of the material from an ambient temperature to a transformation temperature to affect a desired allotropic transformation of the material. Also, the second method may further include decreasing the temperature of the material from the transformation temperature to the ambient temperature to maintain the desired allotropic transformation in the material at the ambient temperature. The high-strength magnetic field alters the deformation properties of the heat-treated material without changing the desired allotropic transformation in the material in certain implementations of the second method.

In yet another embodiment, a system for forming a heat-treated material includes a first portion that has a first susceptor. The first susceptor includes a first tool face shaped according to a desired shape of a first surface of the heat-treated material. The system also includes a second portion that has a second susceptor. The second susceptor includes a second tool face shaped according to a desired shape of a second surface of the heat-treated material. The first and second portions are movable relative to each other to compress a heat-treated material between the first and second susceptors. The system additionally includes electromagnetic coils configured to apply a first magnetic field to the first and second susceptors, and apply a second magnetic field to a heat-treated material between the first and second susceptors. The first magnetic field has a first strength and the second magnetic field has a second strength. The second strength is higher than the first strength. The system further includes a controller operably coupled to the first portion, second portion, and electromagnetic coils. The controller is configured to switchably control the supply of electric power to the electromagnetic coils between oscillating electric power and non-oscillating electric power. The oscillating electric power being supplied to the electromagnetic coils to produce the first magnetic field and the non-oscillating electric power being supplied to the electromagnetic coils to produce the second magnetic field. The oscillating electric power has a peak voltage and the non-oscillating electric power has a constant voltage higher than the peak voltage. After the first magnetic field is applied to the first and second susceptors, and the second magnetic field is applied to a heat-treated material between the first and second susceptors, the controller is configured to control the first and second portions to move relative to each other to compress the heat-treated material between the first and second susceptors.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
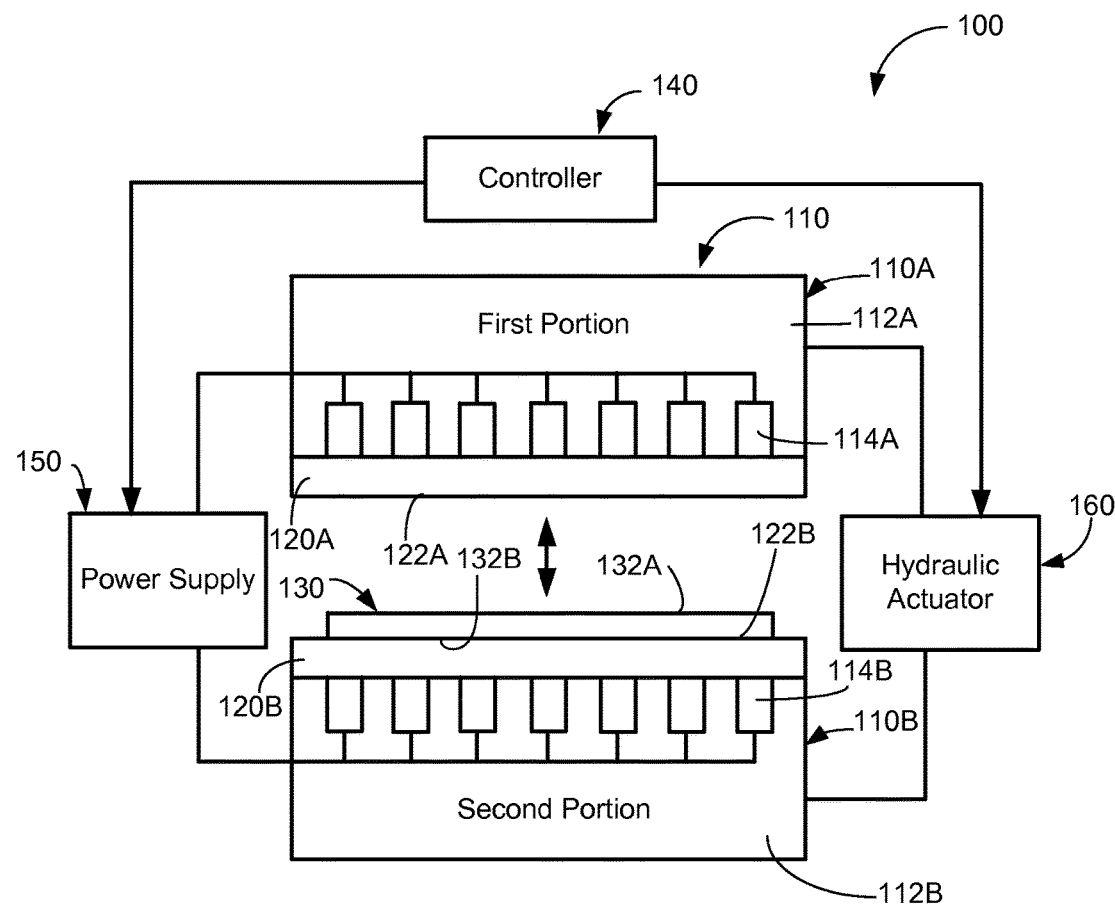
FIG. 1 is a schematic side view of a system for forming a heat-treated material with an apparatus of the system in a first configuration, according to one embodiment.
Figure 2:
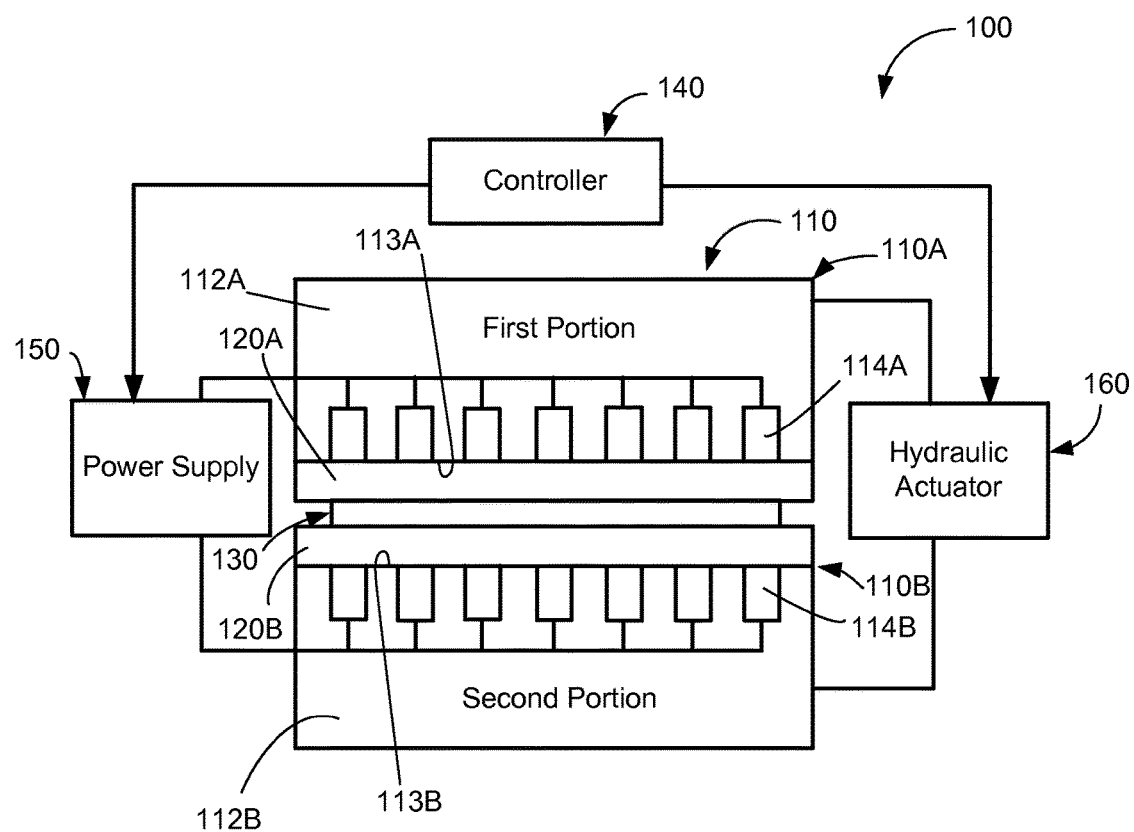
FIG. 2 is a schematic side view of the system of FIG. 1 with the apparatus of the system in a second configuration, according to one embodiment.

Referring to FIG. 1, and according to one embodiment, a system 100 for forming a heat-treated material 130 is shown. The system 100 includes an apparatus 110 operably coupled to a controller 140, power supply 150, and hydraulic actuator 160. The apparatus 110 includes a first portion 110A and a second portion 110B. The first and second portions 110A, 110B are movable relative to each other. More specifically, the first and second portions 110A, 110B are movable toward and away from each other as indicated by the directional arrow in FIG. 1. Movement of the first and second portions 110A, 110B relative to each other can be facilitated by one or more actuators, such as the hydraulic actuator 160, as is known in the art. In some implementations, the first portion 110A includes an upper die 112A and the second portion 110B includes a lower die 112B.

Each of the upper and lower dies 112A, 112B can be made from any of various materials, such as, for example, metals, dielectrics, insulators, and combinations thereof. In one embodiment, one or both of the upper and lower dies 112A, 112B may include a lamination of alternating metal plates and dielectric spacers. The metal plates may be made from non-magnetic austenitic nickel/chromium-based stainless steels or superalloys. In one implementation, one or more dielectric spacers terminate a distance away from interface surfaces 113A, 113B of the upper and lower dies 112A, 112B, respectively, such that only the metal plates define the interface surface of the upper and lower dies 112A, 112B. Additionally, in this manner, air gaps are provided between the portions of the metal plates proximate the interface surfaces 113A, 113B of the upper and lower dies 112A, 112B, which facilitate cooling of susceptors 120A, 120B described below.

At least one of the first portion 110A and second portion 110B includes one or more electromagnetic coils operable to generate a magnetic field. In the illustrated embodiment, the first portion 110A includes a plurality of electromagnetic coils 114A and the second portion 110B includes a plurality of electromagnetic coils 114B. In certain implementations, each of the electromagnetic coils 114A, 114B is a complete, fully functional, electromagnetic coil. However, in some implementations, each of the electromagnetic coils 114A of the first portion 110A is a portion (e.g., first half) of an electromagnetic coil, and each of the electromagnetic coils 114B of the second portion 110B is another portion (e.g., second half) of an electromagnetic coil. When the first portion 110A and second portion 110B are brought together, each of the electromagnetic coils 114A or first halves engage respective electromagnetic coils 114B or second halves to form a fully functional electromagnetic coil.

Whether forming a portion of an electromagnetic coil, or the entirety of an electromagnetic coil, each of the electromagnetic coils 114A, 114B is operable independently of the other electromagnetic coils in some embodiments, or co-dependently with the other electromagnetic coils in other embodiments to generate a magnetic field. Each of the electromagnetic coils 114A, 114B can be the entirety of, or a portion of, any of various electromagnetic coils. Generally, an electromagnetic coil includes a wire made from an electrical conductor and shaped into a coil, spiral, or helix. For example, in one implementation, each electromagnetic coil 114A, 114B is made from lightly drawn copper tubing. As an electric current is passed through the coiled wire, a magnetic field is induced that emanates away from the coiled rod. The intensity of the magnetic field (e.g., magnetic flux) generated by an electromagnetic coil is dependent on the strength of the current applied to the coiled wire.

Figure 3:
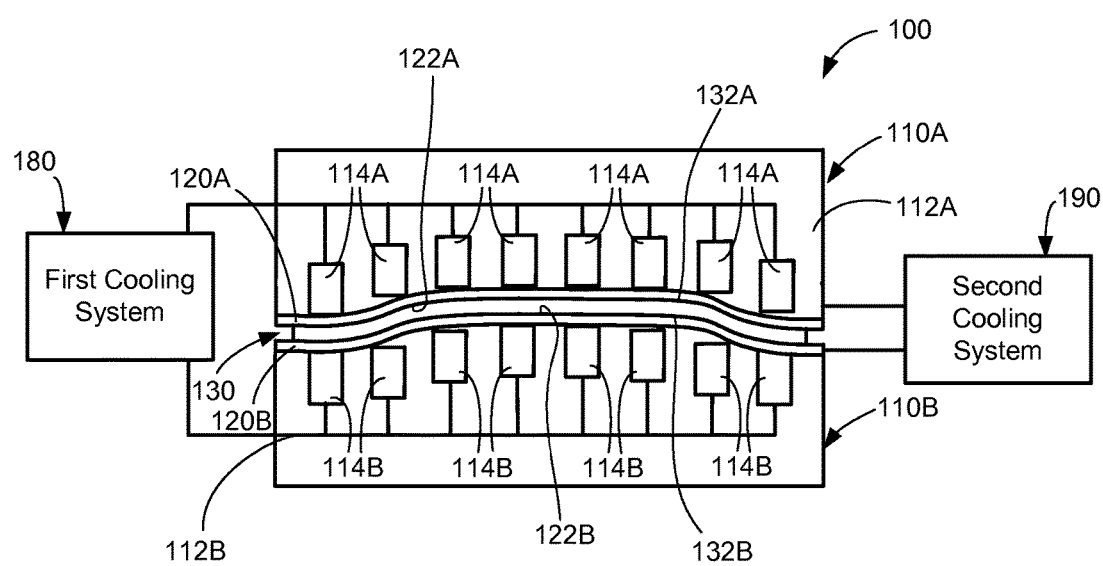
FIG. 3 is a schematic side view of a system for forming a heat-treated material, according to another embodiment.

The electromagnetic coils 114A, 114B are coupled to the respective upper and lower dies 112A, 112B. In some embodiments, as shown, the electromagnetic coils 114A, 114B are embedded within the upper and lower dies 112A, 112B, respectively. For example, the upper and lower dies 112A, 112B may include a plurality of cavities for receiving a respective one of the electromagnetic coils 114A, 114B. As shown in FIG. 3, the cavities, and thus the electromagnetic coils 114A, 114B, formed in each of the upper and lower dies 112A, 112B may be positioned in the die based on the contour of the interface surface 113A, 113B of the die and first and second tool faces 122A, 122B of the susceptors 120A, 120B. More specifically, the cavities and electromagnetic coils are arranged in the upper and lower dies 112A, 112B to complement the shape of the contoured surfaces of the dies and susceptors. In this manner, the electromagnetic coils 114A, 114B are positioned a more uniform distance away from the susceptors 120A, 120B across the entire area of the susceptors.

The first and second portions 110A, 110B of the apparatus 110 also include the first and second susceptors 120A, 120B, respectively. The first and second susceptors 120A, 120B are coupled to the upper and lower dies 112A, 112B, respectively, in relatively close proximity to the electromagnetic coils 114A, 114B, respectively. Moreover, the first and second susceptors 120A, 120B have a first and second tool face 122A, 122B or surface, respectively, shaped according to a desired shape of a respective first and second surface 132A, 132B of the heat-treated material 130. For example, as shown in FIG. 3, the first and second tool faces 122A, 122B are non-planar (e.g., contoured) to define a non-planar shape of the first and second surfaces 132A, 132B of the heat-treated material 130. In some embodiments, such as shown in FIG. 3, the shapes of the first and second tool face 122A, 122B are complementary. Although not shown, the upper and lower dies 112A, 112B may also include interface surfaces 113A, 113B that interface with the first and second susceptors 120A, 120B and are shaped according to the desired shape of the respective first and second surfaces 132A, 132B of the heat-treated material 130. The shaped first and second tool face 122A, 122B of the first and second susceptors 120A, 120B may be seated in the interface surfaces 113A, 113B of the upper and lower dies 112A, 112B, respectively.

The first and second susceptors 120A, 120B are made from an electrically and thermally conductive material that generates heat via electromagnetic induction in the presence of an oscillating magnetic field. In some embodiments, the first and second susceptors 120A, 120B are made from a ferrous material. More specifically, in certain implementations, the first and second susceptors 120A, 120B are made from a ferromagnetic material that generates increasing heat in the presence of an oscillating magnetic field until a predetermined threshold or Curie temperature of the susceptors is reached. Such susceptors can be defined as smart susceptors. As portions of a smart susceptor reach the Curie temperature, the magnetic permeability of those portions falls to unity (i.e., the susceptor becomes paramagnetic) at the Curie temperature. This drop in magnetic permeability has two effects. First, the drop in magnetic permeability limits the generation of heat by those portions at the Curie temperature. Second, the drop in magnetic permeability shifts the magnetic flux to the lower temperature portions, causing those portions below the Curie temperature to more quickly heat up to the Curie temperature. Accordingly, thermal uniformity of the first and second susceptors 120A, 120B can be achieved irrespective of the magnetic field applied to the susceptors by selecting the material from which the susceptors are made.

In accordance with one embodiment, each susceptor 120A, 120B is a layer or sheet of magnetically permeable material. Magnetically permeable materials for constructing the susceptors 120A, 120B may include ferromagnetic materials that have an approximately 10-fold decrease in magnetic permeability when heated to a temperature higher than the Curie temperature. Such a large drop in permeability at the critical temperature promotes temperature control of the susceptor and, as a result, temperature control of the heat-treated material being manufactured as will be described in more detail below. Ferromagnetic materials may include iron, cobalt, nickel, gadolinium and dysprosium, and alloys thereof. The material composition of the ferromagnetic material of the susceptors 120A, 120B is chosen to produce a set temperature point to which the susceptors 120A, 120B are heated in response to the magnetic field (e.g., electromagnetic energy) generated by the electromagnetic coils 114A, 114B. In this regard, the susceptors 120A, 120B may be constructed such that the Curie point of the susceptors, at which there is a transition between the ferromagnetic and paramagnetic phases of the material, defines the set temperature point to which the susceptors are inductively heated. Moreover, the susceptors 120A, 120B may be constructed such that the Curie point is well below or well above a phase transformation temperature of the heat-treated material 130, such that the heat-treated material does not change phases during the formation of the heat-treated material as will be described in more detail below.

The heat-treated material 130 is a component made from any of various materials that has been heat treated to change the crystallographic properties or volumetric growth of the material to effect a desired allotropic transformation of the material. Often, heat treatment of a material increases the strength of the material by inducing an allotropic transformation of the material, which increases a hardness of the material. In some embodiments, the heat-treated material 130 is a component made from a high-strength steel resulting from a heat treatment process, which can be any of various heat treatment processes known in the art. The high-strength steel can be any of various high-strength steels, such as, but not limited to high-hardness armor steel and/or rolled homogenous armor steel. The component can be an armor plate for an armored vehicle. In certain implementations, the armor plate is made from a high-strength steel and is between about 0.125 inches and about 6 inches thick.

Generally, a material becomes a heat-treated material, in part, by heating the material up to a temperature sufficient to induce a change in the phase of the material from a first phase to a second phase, and then rapidly cooling the material to reduce the temperature of the material while maintaining the second phase of the material. Accordingly, when the heat-treated material 130 is introduced to the system 100 for forming the heat-treated material, the heat-treated material has already been heat-treated into the second phase. Moreover, the system 100 is configured to form or shape the heat-treated material 130 into a desired shape without inducing a phase change in the heat treated material or, in this instance, keeping the material in the second phase.

The power supply 150 of the system 100 is operably coupled to the electromagnetic coils 114A, 114B to supply electric power to the electromagnetic coils via power lines as shown. Operation of the power supply 150 can be switched between a first mode and a second mode. The power supply 150 may include a modulator that modulates an electric power signal to the electromagnetic coils 114A, 114B as commanded by the controller 140.

In the first mode, the power supply 150 supplies electric power with an oscillating or alternating current to the electromagnetic coils 114A, 114B for the purpose of heating the first and second susceptors 120A, 120B. The oscillating current results in oscillating magnetic fields generated by the electromagnetic coils 114A, 114B. The oscillating frequency of the magnetic field corresponds with the oscillating frequency of the oscillating current. The power supply 150 is operable to adjust the intensity (e.g., peak power/voltage) and/or frequency of the oscillating current according to a desired intensity (e.g., peak magnetic flux) of the oscillating magnetic fields generated by the electromagnetic coils 114A, 114B.

In the second mode, the power supply 150 supplies electric power with a non-oscillating or direct current (e.g., constant voltage) to the electromagnetic coils 114A, 114B for the purpose of changing the deformation properties (e.g., ductility and/or yield stress characteristics) of the heat-treated material 130 prior to pressing the material. The non-oscillating current results in non-oscillating magnetic fields generated by the electromagnetic coils 114A, 114B. The power supply 150 is operable to adjust the intensity and pulse duration of the non-oscillating current according to a desired intensity and pulse duration of the magnetic fields generated by the electromagnetic coils 114A, 114B.

In the first and second modes, in some embodiments, the power supply 150 is operable to individually or separately control one or more electromagnetic coils 114A, 114B relative to one or more other electromagnetic coils. For example, in the first mode, the power supply 150 may supply oscillating current of a first intensity and first frequency to one or more of the electromagnetic coils 114A, 114B, while concurrently or non-concurrently supplying oscillating current of a second intensity and/or second frequency to one or more other electromagnetic coils for the purposes of heating some portions of the first and second susceptors 120A, 120B differently than others. The second intensity and second frequency are different than the first intensity and first frequency. Similarly, in the second mode, the power supply 150 may supply non-oscillating current of a first intensity and first pulse duration to one or more of the electromagnetic coils 114A, 114B, while concurrently or non-concurrently supplying non-oscillating current of a second intensity and/or second pulse duration to one or more other electromagnetic coils to change the ductility and/or yield stress characteristics of some portions of the heat-treated material 130 differently than other. The second pulse duration is different than the first pulse duration.

Individually controlling one or more of the electromagnetic coils 114A, 114B differently than other electromagnetic coils may result in a more efficient use of power and lower cost to form the heat-treated material 130. Generally, in some embodiments, oscillating magnetic fields of a higher intensity or frequency may be desirable to heat portions of the first and second susceptors 120A, 120B corresponding with portions of the heat-treated material 130 that have shaped features, such as bends, recesses, ridges, and the like, compared to portions of the material without such features. Similarly, non-oscillating magnetic fields of a higher intensity or duration may be desirable to impart a higher change in the ductility and/or yield stress characteristics of the heat-treated material 130 for portions of the material having shaped features compared to portions of the material without such features. Accordingly, the power supply 150 may supply current at a higher intensity, frequency, and/or pulse duration to electromagnetic coils 114A, 114B in the proximity of shaped features of the heat-treated material 130 and/or portions of the susceptors 120A, 120B corresponding with such shaped features.

The controller 140 of the system 100 controls operation of the power supply 150, as well as the hydraulic actuator 160. The controller 140 is depicted in FIG. 1 as a single physical unit, but can include two or more physically separated units or components in some embodiments if desired. In certain embodiments, the controller 140 receives multiple inputs, processes the inputs, and transmits multiple outputs. The multiple inputs may include various user inputs. The inputs are processed by the controller 140 using various algorithms, stored data, and other inputs to update the stored data and/or generate output values. The generated output values and/or commands are transmitted to other components of the controller and/or to one or more elements of the system 10, such as the power supply 150 and hydraulic actuator 160, to control the system to achieve desired results, and more specifically, achieve a desired formation or shaping of the heat-treated material 130.

The controller 140 may be implemented as a hardware circuit comprising custom VLSI circuits or gate arrays, off-the-shelf semiconductors such as logic chips, transistors, or other discrete components. Further, the controller 140 may also be implemented in programmable hardware devices such as field programmable gate arrays, programmable array logic, programmable logic devices or the like. The controller 140 may also be implemented in software for execution by various types of processors. The controller 140 may, for instance, include one or more physical or logical blocks of computer instructions, which may, for instance, be organized as an object, procedure, or function. Nevertheless, the executables of the controller 140 need not be physically located together, but may comprise disparate instructions stored in different locations which, when joined logically together, comprise the module and achieve the stated purpose for the module.

The outputs of the controller 140 to the power supply 150 include commands to supply electric power to the electromagnetic coils 114A, 114B according to one of the two modes. More specifically, in the first mode, the controller 140 commands the power supply 150 to supply oscillating power at a commanded peak intensity (e.g., voltage) and frequency to the electromagnetic coils 114A, 114B for a specified time. In the second mode, the controller 140 commands the power supply 150 to supply non-oscillating power at a commanded intensity and pulse duration to the electromagnetic coils 114A, 114B for a specified number of pulses. Additionally, according to some embodiments, the controller 140 commands the power supply 150 to concurrently supply electric power with first characteristics to some of the electromagnetic coils 114A, 114B and electric power with second characteristics different than the first characteristics others of the electromagnetic coils 114A, 114B.

The outputs of the controller 140 to the hydraulic actuator 160 include commands to move the first and second portions 110A, 110B of the apparatus 110 together and apart. The first and second portions 110A, 110B are moved together to apply pressure to or compress the heat-treated material 130, and moved apart to remove the pressure from the heat-treated material.

Referring to FIG. 3, the system 100 may also include a first cooling system 180 and a second cooling system 190. The first cooling system 180 is operable to cool the electromagnetic coils 114A, 114B. Electric current passing through the electromagnetic coils 114A, 114B heats the coils. Due to the relatively high intensity of the current, the temperatures of the electromagnetic coils 114A, 114B can reach extreme temperatures unsuitable for operation. The first cooling system 180 is fluidly coupled to the electromagnetic coils 114A, 114B to maintain the temperature of the electromagnetic coils within a temperature range suitable for operation. In one implementation, as shown, the first cooling system 180 includes fluid lines in heat transferring communication with the electromagnetic coils 114A, 114B. The first cooling system 180 urges a fluid, such as coolant, through the fluid lines to transfer heat away from the electromagnetic coils 114A, 114B. In other implementations, the first cooling system 180 can be any of various other cooling systems for regulating the temperature of the electromagnetic coils 114A, 114B.

The second cooling system 190 is operable to regulate (e.g., reduce) the temperature of the first and second susceptors 120A, 120B. The second cooling system 190 may be the same as, or separate from, the first cooling system 180. In one implementation, the second cooling system 190 includes fluid lines in heat transferring communication with the first and second susceptors 120A, 120B. The second cooling system 190 urges a fluid, such as coolant, through the fluid lines to transfer heat away from the first and second susceptors 120A, 120B. In other implementations, the second cooling system 190 can be any of various other cooling systems for regulating the temperature of the first and second susceptors 120A, 120B. According to certain implementations, cooling of the first and second susceptors 120A, 120B by the second cooling system 190 also functions to cool other components of the apparatus 110, such as the upper and lower dies 112A, 112B, as well as the heat-treated material 130, via heat transfer from the other components to the first and second susceptors 120A, 120B.

Figure 4:
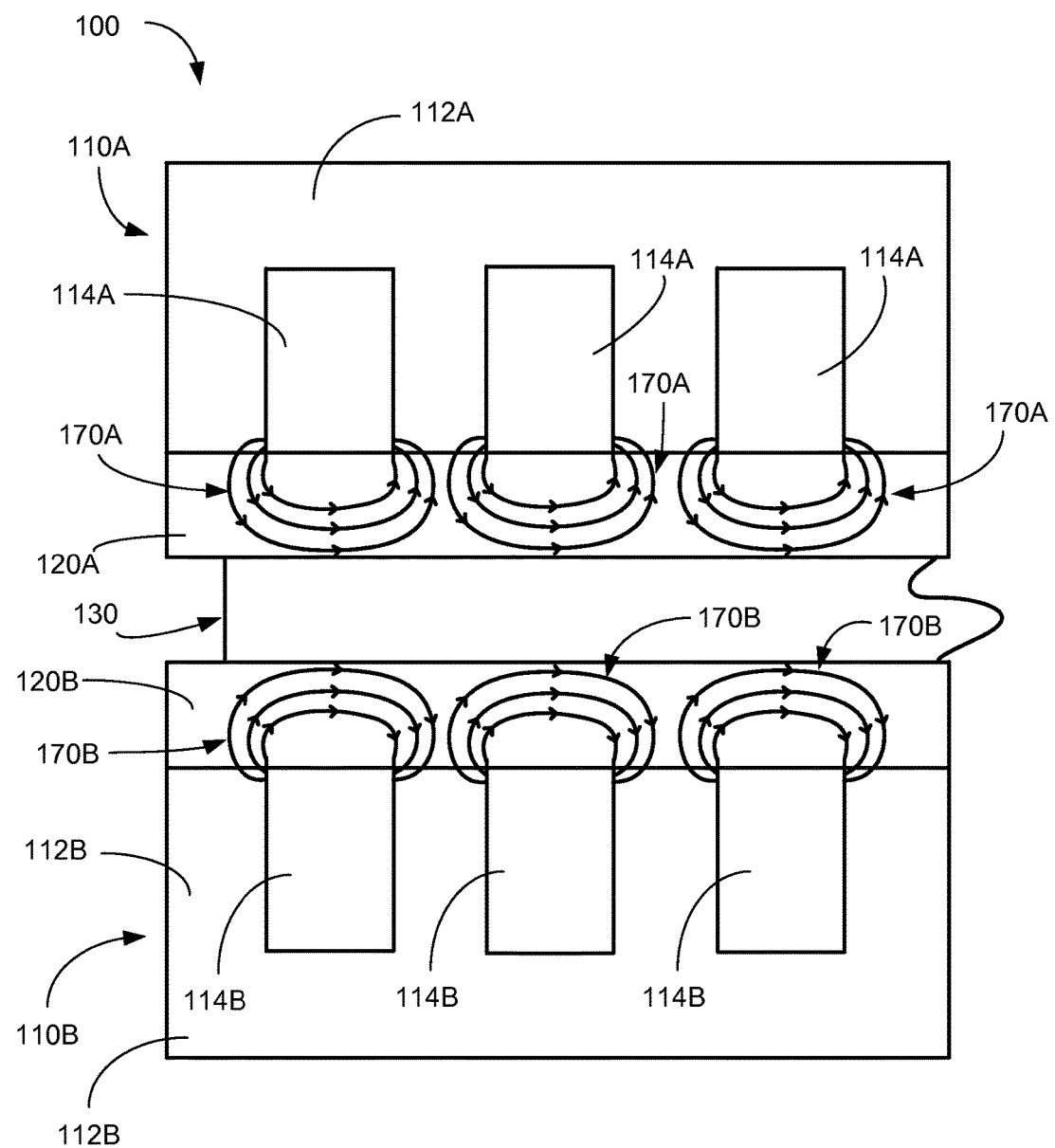
FIG. 4 is a schematic side view of an apparatus for forming a heat-treated material, according to one embodiment.
Figure 5:
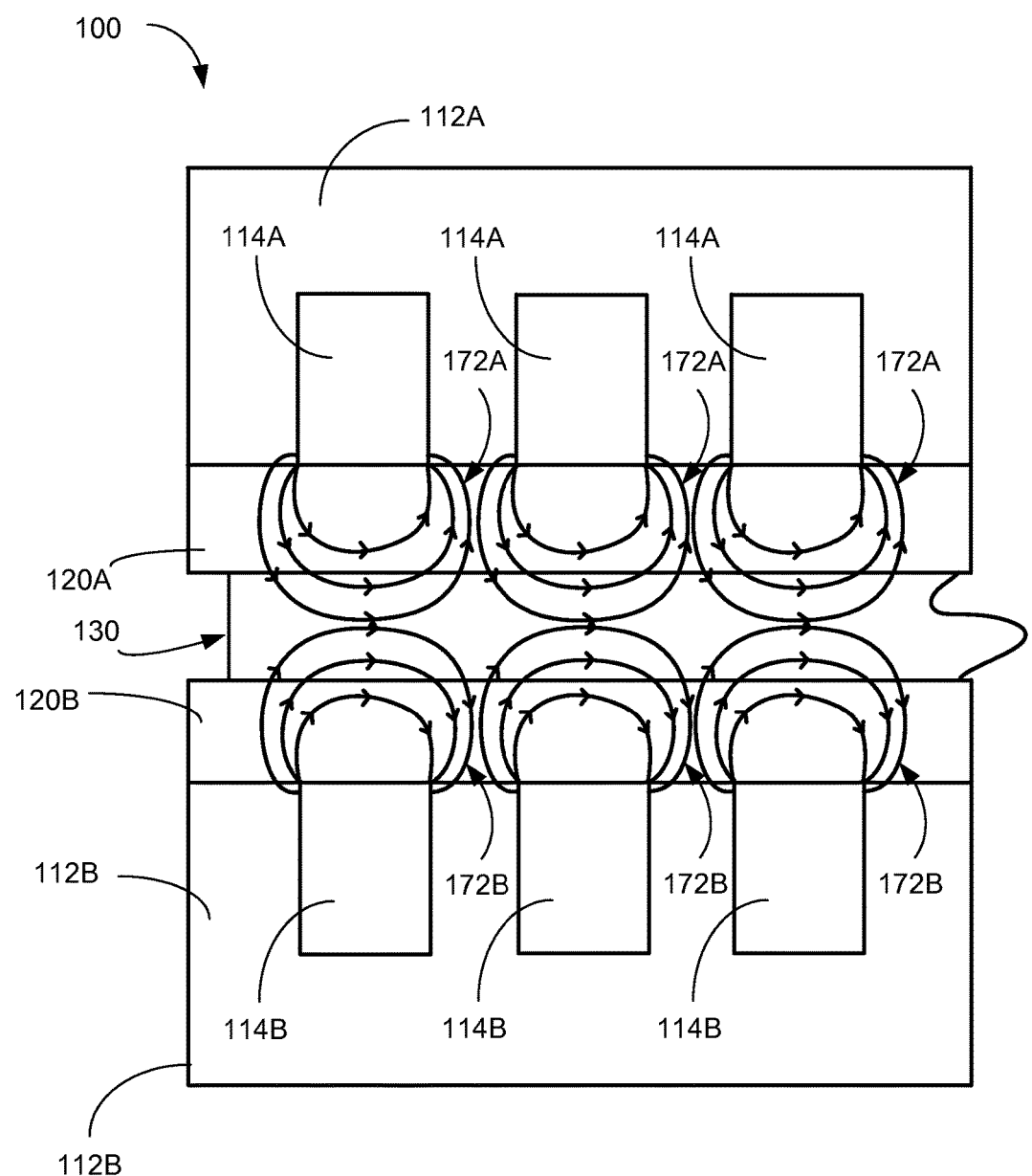
FIG. 5 is a schematic side view of the apparatus of FIG. 4, according to one embodiment.
Figure 6:
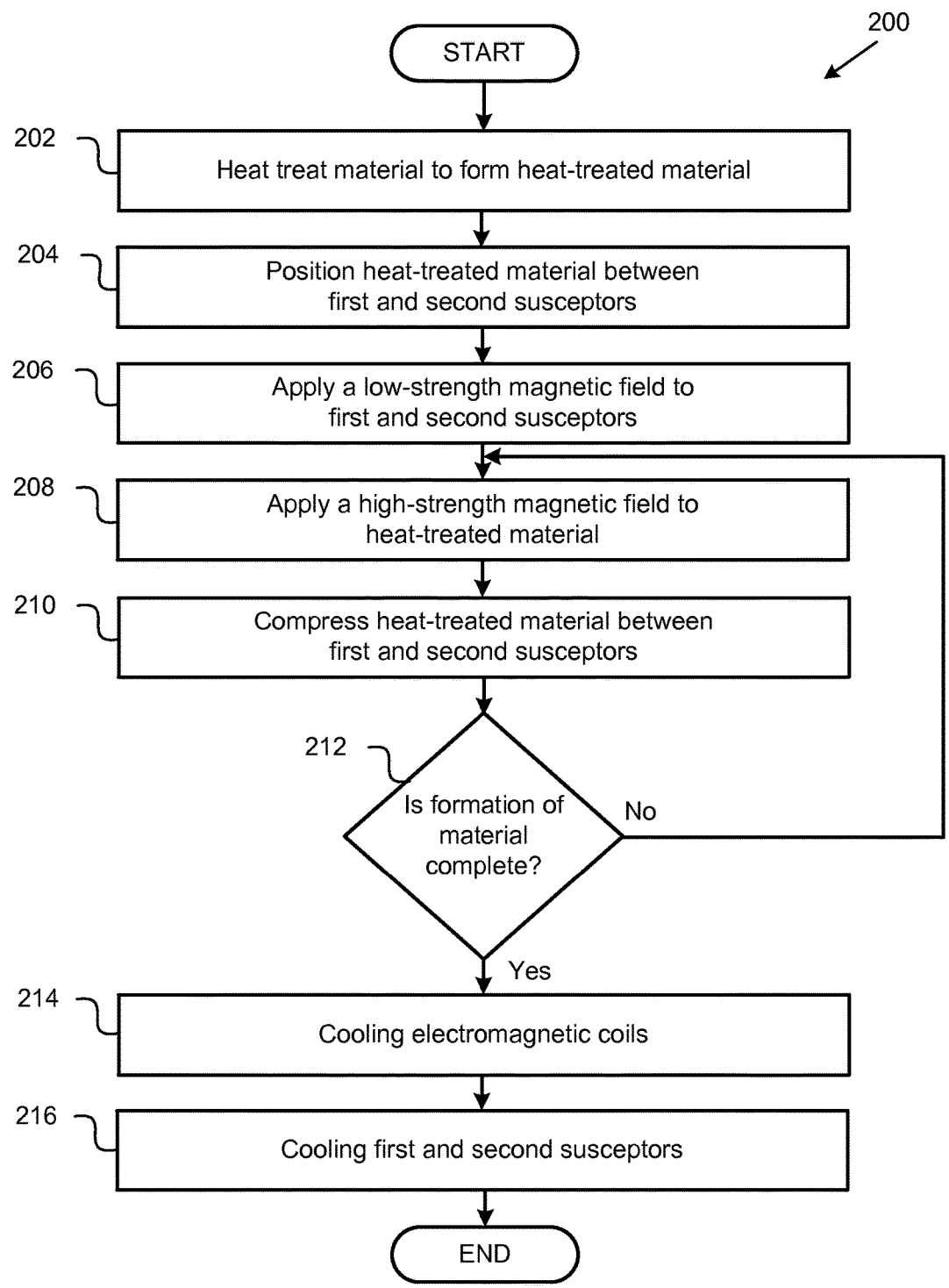
FIG. 6 is a schematic flow diagram of a method of forming a heat-treated material, according to one embodiment.

Referring to FIGS. 4-6, a method 200 of forming a heat-treated material 130 according to one embodiment is shown. The method 200 begins by heat treating a material to form the heat-treated material 130 as described above. According to one implementation, as an example only, following heat treatment at 202, the crystallographic properties of the heat-treated material 130 may correspond with the phase diagram 192 of FIG. 7, or other analogous phase diagram. The heat treatment of the material to form the heat-treated material 130 is performed using a heat treatment system separate from the system 100. In fact, in some implementations, the heat treatment of the material is performed well in advance of the remaining steps 204-212 of the method 200, and the temperature of the heat-treated material 130 is at ambient temperature.

After the heat-treated material 130 is formed by heat treating the material at 202, the method 200 at 204 includes positioning the heat-treated material 130 between first and second susceptors, such as the first and second susceptors 120A, 120B of the apparatus 110. Positioning the heat-treated material 130 between the first and second susceptors at 204 may include setting the heat-treated material onto the second susceptor with the first susceptor spaced apart from the heat-treated material.

With the heat-treated material 130 between the first and second susceptors, or, in some implementations, prior to positioning the heat-treated material 130 between the first and second susceptors, the method 200 includes applying a low-strength magnetic field to the first and second susceptors at 206. Referring to FIG. 4, according to one embodiment, each of the electromagnetic coils 114A, 114B generates a low-strength magnetic field 170A, 170B, respectively. The low-strength magnetic fields 170A, 170B transmit from the electromagnetic coils 114A, 114B into the first and second susceptors 120A, 120B, respectively. As mentioned above, the low-strength magnetic fields 170A, 170B are generated by the electromagnetic coils 114A, 114B as a low-strength oscillating current with a desired peak intensity and frequency is applied to each of the electromagnetic coils for a desired duration. The low-strength magnetic field applied to the first and second susceptors at step 206 of the method 200 can be defined as a single magnetic field generated by one electromagnetic coil, or a collective magnetic field comprised of the combination of magnetic fields generated by multiple electromagnetic coils.

The low-strength magnetic fields 170A, 170B are oscillating magnetic fields with a relatively low peak magnetic flux in some implementations. The peak magnetic flux of the low-strength magnetic field can be below about 0.05 tesla in certain implementations, and below about 1 tesla in one implementation. Further, in some implementations, the oscillating frequency of the low-strength magnetic fields 170A, 170B can be between about 60 Hz and about 10,000 Hz. The application of the low-strength magnetic field to the first and second susceptors heats the susceptors. Preferably, the peak magnetic flux of the low-strength magnetic field is high enough that the first and second susceptors heat up to the Curie temperature of the susceptors.

Figure 7:
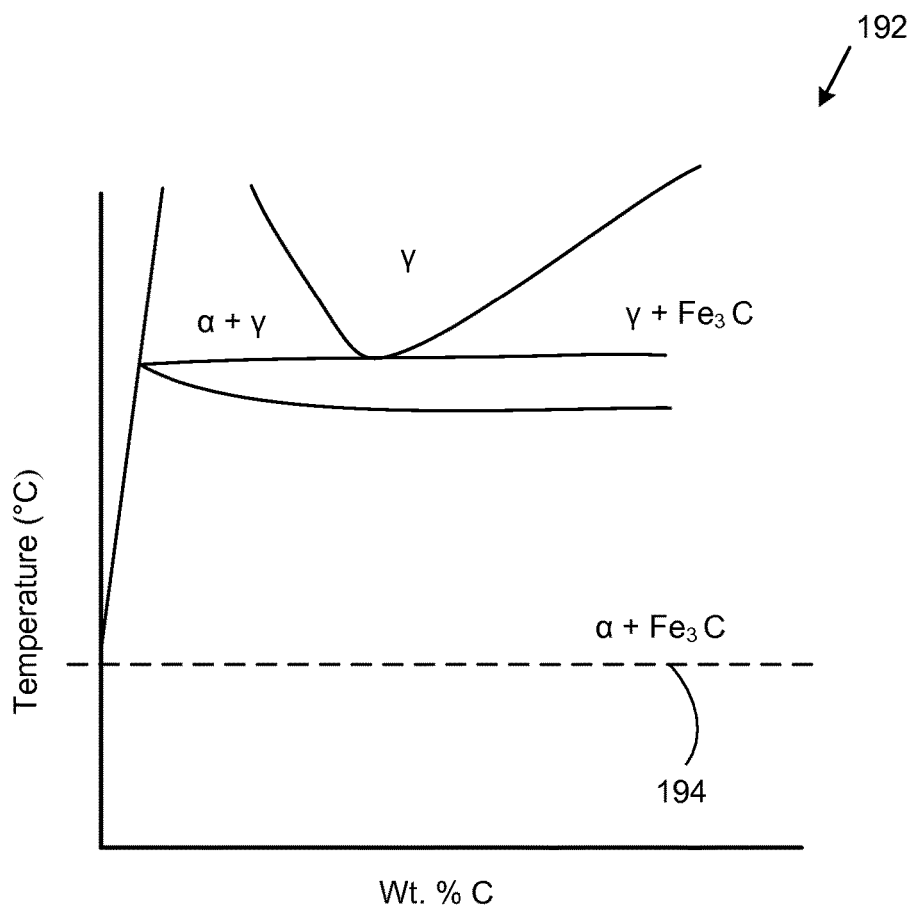
FIG. 7 is a phase diagram for a heat-treated material, according to one embodiment.

After heating the first and second susceptors, and with the heat-treated material 130 between the first and second susceptors, heat from the susceptors is transferred to the heat-treated material 130 to increase the processing temperature of the heat-treated material up to a desired temperature 194. Heating the heat-treated material 130 may include moving first and second susceptors toward each other to bring the heat-treated material 130 into close proximity or in contact with, but without applying substantial compressive forces to, both first and second susceptors. Heat may be transferred from the first and second susceptors to the heat-treated material 130 through any of various heat transfer mechanisms, such as conduction and radiation. The desired temperature 194 is selected such that for a given percentage of carbon in the heat-treated material 130 the desired temperature is well below a temperature necessary to effectuate a phase change in the heat-treated material 130. The desired temperature 194 can be the same as the Curie temperature of the susceptors. For example, the heat-treated material is a high-strength steel, such as is used for armor plates for vehicles, and the desired temperature 194 is below about 150° C. in some embodiments, and below about 300° C. in other embodiments. Referring to FIG. 7, in some embodiments, the desired temperature 194 is associated with the heat-treated material 130 remaining well within a ferrite (α) and cementite ($Fe_3C$) crystallographic phase of the heat-treated material (e.g., well below a phase transition temperature) during formation of the heat-treated material. In other words, with the temperature of the heat-treated material 130 at the desired temperature 194, the material is shaped into a desired shape without changing the phase distributions and resulting hardness of the material.

With the temperature of the heat-treated material 130 raised via application of a low-strength magnetic field to the first and second susceptors at 206, the method 200 includes applying a high-strength magnetic field to the heat-treated material at 208. Referring to FIG. 5, according to one embodiment, each of the electromagnetic coils 114A, 114B generates a high-strength magnetic field 172A, 172B, respectively. The high-strength magnetic fields 172A, 172B transmit from the electromagnetic coils 114A, 114B into the first and second susceptors 120A, 120B, respectively, and the heat-treated material 130. As mentioned above, the high-strength magnetic fields 170A, 170B are generated by the electromagnetic coils 114A, 114B as a high-strength non-oscillating current with a desired intensity, pulse duration, and pulse quantity is applied to each of the electromagnetic coils. The high-strength magnetic fields 172A, 172B are generated from the same electromagnetic coils 114A, 114B that generated the low-strength magnetic fields 170A, 170B. In operation, switching between generation of a low-strength magnetic field and high-strength magnetic field includes switching between supplying a low-strength oscillating current and a high-strength non-oscillating current to the electromagnetic coils 114A, 114B. Like the low-strength magnetic field, the high-strength magnetic field applied to the heat-treated material 130 at step 208 of the method 200 can be defined as a single magnetic field generated by one electromagnetic coil, or a collective magnetic field comprised of the combination of magnetic fields generated by multiple electromagnetic coils.

The high-strength magnetic fields 172A, 172B are non-oscillating magnetic fields with a relatively high magnetic flux in some implementations. The magnetic flux of the high-strength magnetic field can be above about 0.2 tesla in certain implementations, and above about 5 tesla in one implementation. Further, in some implementations, the pulse duration of each pulse of high-strength magnetic field can be between about 2 seconds and about 30 seconds, and pulse delay between pulses of a given set of pulses can be between about 2 seconds and about 30 seconds. The pulse quantity, or the number of pulses of high-strength non-oscillating magnetic fields applied to the heat-treated material 130 in a given set of pulses, can be between 5 pulses and about 500 pulses.

The application of the high-strength magnetic fields 172A, 172B to the heat-treated material 130 changes the deformation properties of the heat-treated material while not changing the crystallographic phase of the material. The deformation properties of the heat-treated material 130 changed by the high-strength magnetic field include the ductility of the material and the yield stresses within the material. Generally, the high-strength magnetic fields 172A, 172B increase the ductility of the heat-treated material 130 by increasing the ability of the material to deform under tensile stress, which may be attributed to an increase in the ability of the grain boundaries within the material to slip over each other. According to one embodiment, the characteristics of the high-strength magnetic fields 172A, 172B are selected such that the ductility of the heat-treated material 130 increases by between about 50% and about 200%. Further, in some implementations, the high-strength magnetic fields 172A, 172B reduces the yield stresses in the heat-treated material 130, which enhances the deformability of the material.

After the high-strength magnetic fields 172A, 172B are applied to the heat-treated material 130 at 208 of the method 200, and the deformation properties of the heat-treated material are changed, the method includes compressing the heat-treated material 130 between the first and second susceptors 120A, 120B at 210. With the deformation properties of the heat-treated material changed to enhance the deformability of the material, compression of the heat-treated material between the first and second susceptors 120A, 120B deforms the shape of the material into a desired shape defined by the tool faces 122A, 122B of the susceptors, as well as the interface surfaces of the dies 112A, 112B. In certain implementations, the non-oscillating high-strength magnetic field applied at 208 is removed from the heat-treated material 130 before the material is compressed at 210. Alternatively, the non-oscillating high-strength magnetic field applied at 208 is continuously applied to the heat-treated material 130 for at least part, if not all, of the duration of the compression of the heat-treated material.

Due to the cost and thermal constraints associated with the application of high-strength current to the electromagnetic coils 114A, 114B to generate the high-strength non-oscillating magnetic field at 208, the high-strength non-oscillating magnetic field may be applied in multiple limited-duration pulses. In some embodiments, each pulse of a high-strength non-oscillating magnetic field is followed by a compression and release of the heat-treated material. For example, after a single pulse (or multiple pulses in some embodiments) of a high-strength non-oscillating magnetic field to the heat-treated material 130 at 208, and the subsequent compression of the heat-treated material at 210 is completed and the compressive forces are removed, the method 200 includes determining whether formation of the material is complete at 212. If formation of the heat-treated material 130 is complete at 212 (i.e., the heat-treated material is shaped into the desired shape), then the method 200 proceeds to at least one of cool the electromagnetic coils 114A, 114B at 214 and cool the first and second susceptors 120A, 120B at 216. However, if formation of the heat-treated material 130 is not complete at 212, then the method 200 returns to step 208 to apply another pulse, or pulses, of high-strength non-oscillating magnetic field to the heat-treated material 130 and again compresses the heat-treated material at 210. Accordingly, the sub-process of applying high-strength non-oscillating magnetic field to the heat-treated material 130 at 208 and compressing the heat-treated material at 210 is repeated until the heat-treated material is shaped into the desired shape.

Cooling the electromagnetic coils at 214 of the method 200 may occur after applying the high-strength magnetic field to the heat-treated material at 208 or after compressing the heat-treated material at 210 in some embodiments. However, in other embodiments, cooling the electromagnetic coils at 214 may occur concurrently with applying the high-strength magnetic field to the heat-treated material at 208 and/or after compressing the heat-treated material at 210. The first cooling system 180 can be used to cool the electromagnetic coils at 214 of the method 200.

Cooling the first and second susceptors at 216 occurs after the formation of the heat-treated material is complete at 212. As noted above, cooling of the first and second susceptors also induces cooling of the heat-treated material. Cooling of the first and second susceptors at 216 can be accomplished via the second cooling system 190.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of forming a heat-treated material, comprising:
    positioning the heat-treated material between first and second susceptors, each of the first and second susceptors comprising a tool face shaped according to a desired shape of the heat-treated material;
    applying a first magnetic field from a plurality of electromagnetic coils to the first and second susceptors to heat the first and second susceptors, wherein the first magnetic field is an oscillating magnetic field;
    compressing the heat-treated material between the first and second susceptors to form the heat-treated material into the desired shape; and
    after applying the first magnetic field from the plurality of electromagnetic coils to the first and second susceptors, applying a second magnetic field from the plurality of electromagnetic coils to the heat-treated material before compressing the heat-treated material between the first and second susceptors, wherein the second magnetic field is a non-oscillating magnetic field and has a peak magnetic flux greater than that of the first magnetic field;
    wherein the second magnetic field alters deformation properties of the heat-treated material without changing a phase of the heat-treated material.

2. The method of claim 1, wherein the first magnetic field has a peak magnetic flux below 0.5 tesla.

3. The method of claim 1, wherein the peak magnetic flux of the second magnetic field is above 1 tesla.

4. The method of claim 3, wherein the peak magnetic flux of the second magnetic field is above 5 tesla.

5. The method of claim 1, wherein the second magnetic field increases a ductility of the heat-treated material by at least about 50%.

6. The method of claim 5, wherein the second magnetic field increases a ductility of the heat-treated material up to about 200%.

7. The method of claim 1, wherein the second magnetic field increases a ductility of and decreases yield stresses in the heat-treated material.

8. The method of claim 1, wherein the heat-treated material comprises an armor plate made from steel.

9. The method of claim 1, wherein applying the second magnetic field to the heat-treated material comprises applying a plurality of non-oscillating second magnetic field pulses to the heat-treated material.

10. The method of claim 1, further comprising heating the heat-treated material to a processing temperature, which does not result in a phase transition of the material, with heat from the first and second susceptors.

11. The method of claim 10, wherein the processing temperature is below about 150° C.

12. The method of claim 10, wherein the processing temperature is equal to a Curie temperature of the first and second susceptors.

13. The method of claim 1, further comprising concurrently quenching the first susceptor, second susceptor, and the heat-treated material after compressing the heat-treated material between the first and second susceptors.

14. The method of claim 1, wherein applying the first magnetic field from the plurality of electromagnetic coils to the first and second susceptors comprises:
applying a magnetic field, having a first peak magnetic flux, from at least one of the plurality of electromagnetic coils to a first portion of at least one of the first and second susceptors; and
applying a magnetic field, having a second peak magnetic flux different than the first peak magnetic flux, from another at least one of the plurality of electromagnetic coils to a second portion of at least one of the first and second susceptors different than the first portion of at least one of the first and second susceptors.

15. The method of claim 1, wherein applying the second magnetic field from the plurality of electromagnetic coils to the heat-treated material comprises:
applying a magnetic field, having a first magnetic flux and a first pulse duration, from at least one of the plurality of electromagnetic coils to a first portion of the heat-treated material; and
applying a magnetic field, having a second magnetic flux and a second pulse duration, from at least one of the plurality of electromagnetic coils to a second portion of the heat-treated material different than the first portion of the heat-treated material, wherein the at least one of the first magnetic flux is different than the second magnetic flux and the first pulse duration is different that the second pulse duration.

16. The method of claim 1, wherein the phase of the heat-treated material is a crystallographic phase of the heat-treated material.

17. A method of forming a material, comprising:
heat treating the material to form a heat-treated material;
positioning the heat-treated material between first and second susceptors, each of the first and second susceptors comprising a tool face shaped according to a desired shape of the heat-treated material;
applying a first magnetic field from a plurality of electromagnetic coils to the first and second susceptors to heat the first and second susceptors, wherein the first magnetic field is an oscillating magnetic field;
compressing the heat-treated material between the first and second susceptors to form the heat-treated material into the desired shape; and
after applying the first magnetic field from the plurality of electromagnetic coils to the first and second susceptors, applying a second magnetic field from the plurality of electromagnetic coils to the heat-treated material before compressing the heat-treated material between the first and second susceptors, wherein the second magnetic field is a non-oscillating magnetic field and has a peak magnetic flux greater than that of the first magnetic field,
wherein heat treating the material comprises:
raising a temperature of the material from an ambient temperature to a transformation temperature to affect a desired allotropic transformation of the material; and
decreasing the temperature of the material from the transformation temperature to the ambient temperature to maintain the desired allotropic transformation in the material at the ambient temperature; and
wherein the second magnetic field alters deformation properties of the heat-treated material without changing the desired allotropic transformation in the material.

18. The method of claim 17, wherein heat treating the material comprises hardening the material.

19. The method of claim 17, wherein the second magnetic field is applied to the heat-treated material while compressing the heat-treated material between the first and second susceptors.

20. The method of claim 17, wherein the second magnetic field is removed from the heat-treated material before the heat-treated material is compressed between the first and second susceptors.

* * * * *